United States Patent [19]
Bien

[11] Patent Number: 4,643,610
[45] Date of Patent: Feb. 17, 1987

[54] FASTENER MOUNTING ASSEMBLY

[75] Inventor: Alfred A. Bien, W. Bloomfield, Mich.

[73] Assignee: Chrysler Motors Corporation, Highland Park, Mich.

[21] Appl. No.: 880,443

[22] Filed: Jun. 30, 1986

[51] Int. Cl.$^4$ .................. F16B 37/02; F16B 37/04; F16B 41/00
[52] U.S. Cl. .................. 403/407.1; 411/112; 411/175; 411/970
[58] Field of Search .............. 411/111, 112, 113, 172, 411/173, 174, 175, 182, 427, 520, 522, 523, 970; 403/299, 393, 407.1

[56] References Cited

U.S. PATENT DOCUMENTS

| | | | |
|---|---|---|---|
| 2,020,993 | 11/1935 | Chamberlin | 411/520 |
| 2,157,641 | 9/1939 | Tinnerman | 411/970 |
| 3,403,641 | 10/1968 | Baker | 403/407.1 X |
| 3,506,291 | 4/1970 | Mehelich | 411/520 |
| 3,898,784 | 8/1975 | Sauer et al. | 403/393 X |
| 4,270,591 | 6/1981 | Gill et al. | 411/112 |

FOREIGN PATENT DOCUMENTS

| | | | |
|---|---|---|---|
| 2507892 | 9/1976 | Fed. Rep. of Germany | 411/112 |
| 2636354 | 2/1978 | Fed. Rep. of Germany | 411/427 |
| 777277 | 6/1957 | United Kingdom | 411/112 |
| 1204338 | 9/1970 | United Kingdom | 411/112 |

Primary Examiner—Thomas J. Holko
Attorney, Agent, or Firm—Edward P. Barthel

[57] ABSTRACT

Disclosed is a fastener assembly for application to a support panel to receive a threaded bolt extending through a passage in the support panel. A sheet metal element body portion has means for threadably engaging the bolt. The sheet metal element is formed with an integral attaching ramp portion of a size to pass through an open loop strap struck from a pierced transversely extending slot in the support panel. A V-shaped cut-out in said ramp portion defines a spring arm struck therefrom terminating in a downwardly bent tongue. The ramp portion has a pair of stop shoulders operative to engage the strap transversely facing walls thereby aligning the body thread engaging means with the support panel passage upon the tongue being snapped into interlocking relation with the slot.

3 Claims, 8 Drawing Figures 4,643,610

FASTENER MOUNTING ASSEMBLY

BACKGROUND OF THE INVENTION

This invention relates generally to a mounting assembly for a threaded fastener and in particular to a mounting assembly which is adapted for mid-panel attachment to a support panel open loop strap struck therefrom.

As discussed in U.S. Pat. No. 4,270,591 issued June 2, 1981 to Gill et al. in the assembly of certain vehicle components to a support panel, it is necessary to use a panel fastener that can be easily and economically attached to the support panel from the exposed side thereof. In the Gill patent it is necessary that a special threaded bolt be used having a head wider than a slot of a keyhole shaped opening located in the support panel.

SUMMARY OF THE INVENTION

The primary object of this invention is to provide an improved fastener mounting assembly for mid-panel application to an apertured support panel whereby an open-loop strap is struck from the panel which cooperates with the attaching sheet metal clip element in a snap-in releasable interlocking manner. The invention is particularly useful in the case of supporting metal panels of insufficient thickness or composition to form suitable threads with which a bolt or screw fastener may threadably engage and be secured effectively.

Another object of the invention is to provide an improved fastener mounting assembly for application to a support panel having an open-loop strap struck from the panel in predetermined spaced relation with a bolt receiving passage whereby an attaching sheet metal clip element for the threaded bolt can be used with steel support panels having a thickness or composition that will not permit the welding of a fastener thereto.

Other more specific objects and advantages of the invention will become apparent when reference is made to the following description and accompanying drawings.

DETAILED DESCRIPTION OF THE INVENTION

Figure 1:
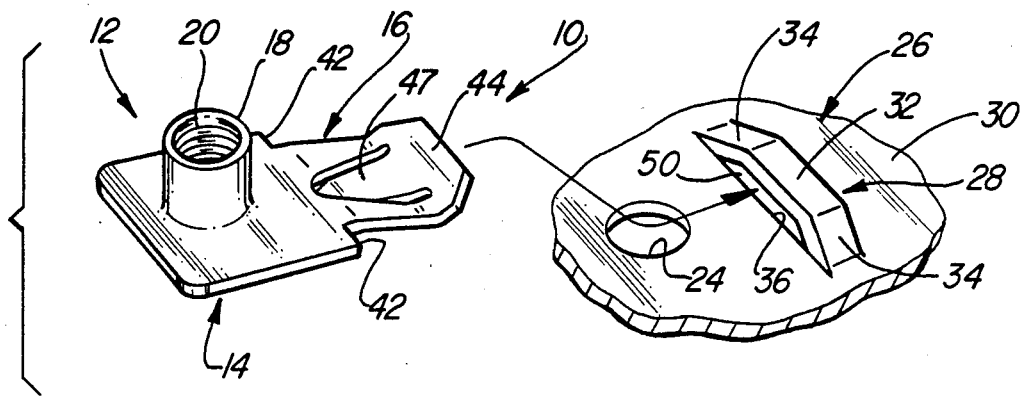
FIG. 1 is an exploded perspective view of the fastener mounting adapted for assembly in accordance with the teaching of this invention.

Referring more specifically to the drawings, a mounting assembly for a threaded fastener involving the principle of this invention is shown best in FIG. 1. The mounting assembly, generally indicated at 10, includes a sheet metal clip element 12 comprising a generally rectangular body portion 14 and an attaching ramp portion 16. The body portion 14 provides integral threaded fastener engaging means in the form of a raised cylindrical open ended extrusion socket 18 for threadably engaging a conventional bolt or screw fastener indicated at 19 in FIG. 3. Such bolt is adapted to thread to internal threads 20 around the periphery of socket bore 22 shown in FIG. 3. Obviously, the bore 22 is required to be aligned with a bolt receiving circular opening or passage 24 in an underlying supporting panel member generally indicated at 26 in FIG. 1.

Figure 5:
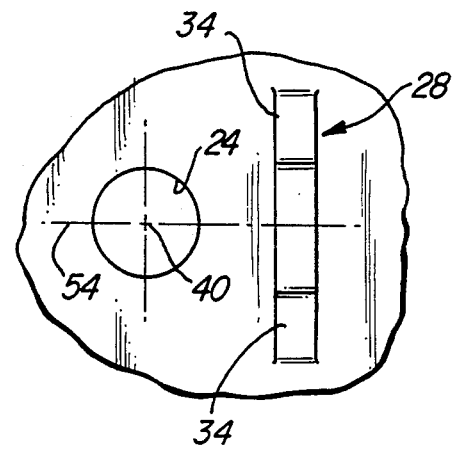
FIG. 5 is a top elevational detail view of the support panel shown in FIG. 1.

The panel member 26 is shown as a flat sheet or plate member which may be fabricated from various suitable materials such as metal, plastic, composite etc. The panel member 26 is formed with an elongated open loop strap portion 28 struck from a lanced slot 29 (FIG. 3) therein. The strap portion 28 protrudes upwardly a predetermined distance above the panel member's one upper surface 30. The elongated strap 28 comprises a planar bridge portion 32 integrally connected to the panel member 26 by a pair of upwardly tapered or angled wall portions 34 at each end so as to transversely face one another. The bridge portion 32 is oriented substantially parallel to the plane of the panel member upper surface 30. It will be noted that the open loop strap portion 28 defines the transversely extending slot 29 having parallel vertically disposed forward and aft internally opposed sides 36 and 38. As best seen in FIG. 5 the circular passage 24 has its center 40 located a predetermined equal distance from the strap tapered wall portions 34.

Figure 2:
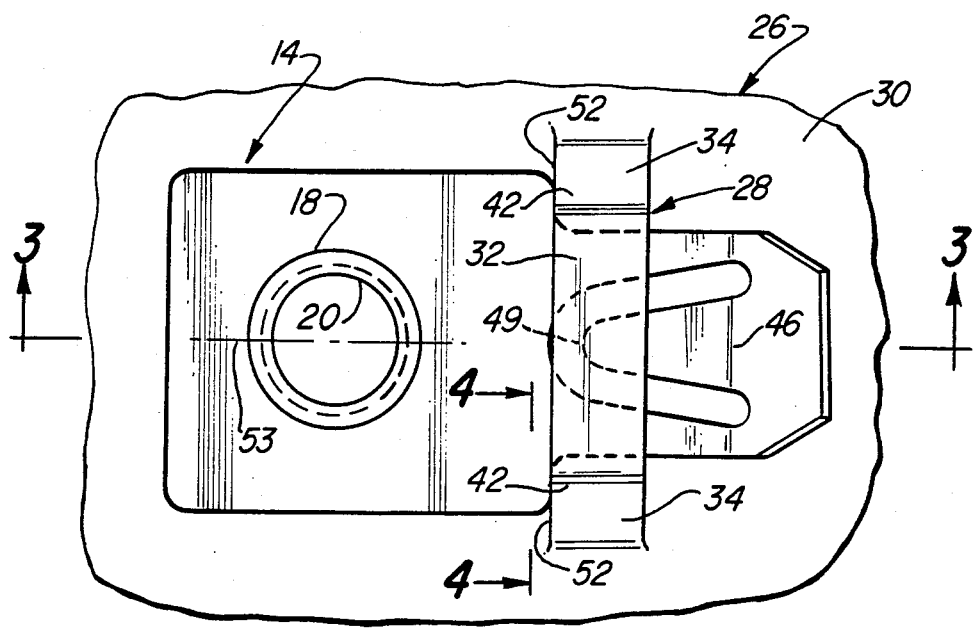
FIG. 2 is an enlarged top elevational view of the fastener mounting assemby of FIG. 1.
Figure 3:
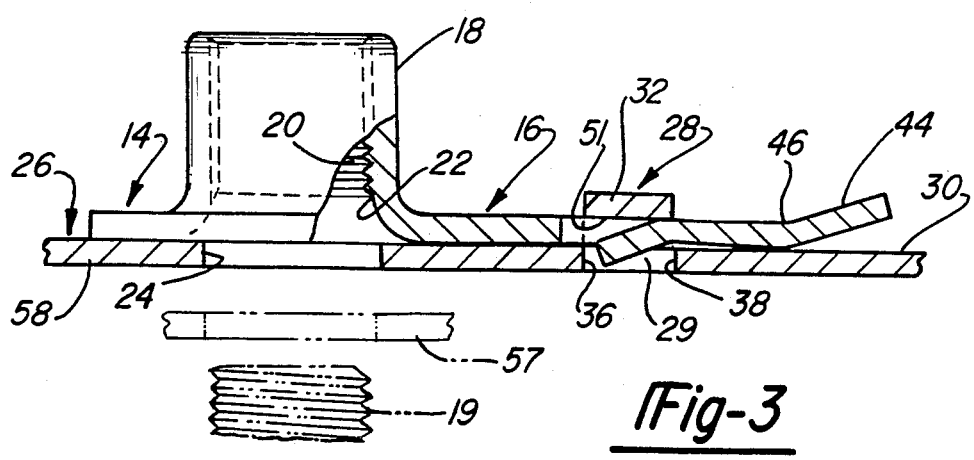
FIG. 3 is a partial vertical cross-sectional view taken generally in the plane of line 3—3 of FIG. 2, illustrating the assembled metal clip element with a support panel in relation to a threaded fastener.

With reference to FIGS. 1-3 the attaching ramp portion 16 extends rearwardly and downwardly from the body portion 14 at a slight acute angle "X" (FIG. 3A) of about 5 degrees from the horizontal. The ramp portion 16 has a predetermined width less than the width of the body portion 14 defining a pair of rearwardly facing stop shoulders 42. The attaching ramp portion 16 has its free end formed with a transverse lip 44 bent upwardly therefrom about a transverse bend-line 46 at an acute angle "Y" (FIG. 3A) of about 20 degrees from the horizontal.

Figure 3A:
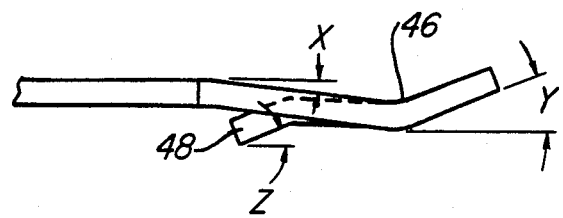
FIG. 3A is a fragmentary detail side elevational view of the ramp portion of the clip element.

The attaching ramp portion 16 is formed with a V-shaped cut-out defining a triangular-shaped spring arm 47 located within the cut-out. The spring arm 47 is struck from the attaching ramp portion 16 and is bent downwardly about the bend-line 46 so as to extend forwardly toward the body portion 12 and oriented substantially parallel to the plane of the body portion 12 as seen in FIG. 3A. The spring arm 47 forward end terminates on a downwardly bent torque 48 defining an acute angle "Z" of about 20 degrees from the horizontal. As seen in FIG. 2 the tongue 48 has a rounded forward extermity 49 adapted to engage the slot forward side 36 upon the mounting being assembled. It will be noted that the triangular-shaped spring arm 47 has its transverse base oriented substantially on the bend-line 46.

Figure 4:
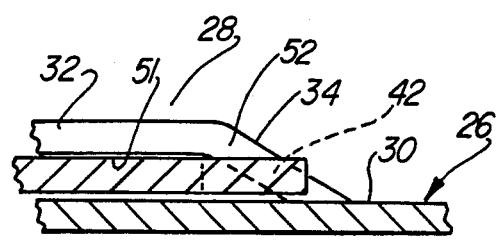
FIG. 4 is an enlarged fragmentary vertical sectional view taken on the line 4—4 of FIG. 2.

In completing an assembly of the fastener mounting 10 in accordance with the invention, the clip element 12 is easily and quickly attached to the panel member 26 by simply sliding the lip 44 rearwardly through the strap open loop bridged opening indicated at 50 in FIG. 1. This is accomplished by canting the clip element 12 upwardly as necessary for the attaching portion 16 to enter the bridged opening 50. As the clip element 12 is pushed rearwardly strap undersurface 51 rides along the ramp portion 16 causing the spring arm 47 and its tongue 48 to resiliently flex into the plane of the ramp portion 16 by upward pressure on its tongue 48 slidably engaging upper surface 30 of the panel member 26. Continued rearward travel of the clip element 12 causes the spring arm tongue 48 to snap into the slot 29. The clip element 12 is, however, free for further rearward travel until the pair of stop shoulders 42 contact forward edges 52 of the strap tapered wall portions 34 as shown in FIGS. 2 and 4.

In this regard it will be noted that the transverse dimension of the attaching ramp portion is substantially equal to but less than the transverse dimension of the strap bridge portion 32. This dimensional relationship aligns the longitudinal axis 53 (FIG. 2) of symmetry of the clip element 12 with the construction line 54 (FIG. 5) extending from the center of the passage 24 so as to intersect the transverse principal axis of the strap 28 at right angles. Thus, with the pair of stop shoulders 42 contacting their associated strap tapered walls 34 the extruded bore 22 principal axis is substantially aligned with the center 40 of the passage 24. As a consequence the fastener 19 being threaded into socket threads 20 extend through passage 24 for securing a member, such as a molding strip, indicated by dashed lines 57, to panel undersurface 58, for example.

It will be noted that upon the tongue 48 snapping into the slot 36 the element 12 is locked to the support panel 26 by virtue of its rounded extremity 49 being positioned to engage the slot forward side 36 preventing the withdrawal of the element from the strap open loop opening 50. However, because the spring arm 47 continues to be biased into the plane of the ramp portion 16, the clip element 12 is held in resiliently biased contact between the strap undersurface 51 and the support panel maintaining the stop shoulders 42 in contact with their associated tapered sidewall forward edges 52.

Figure 6:
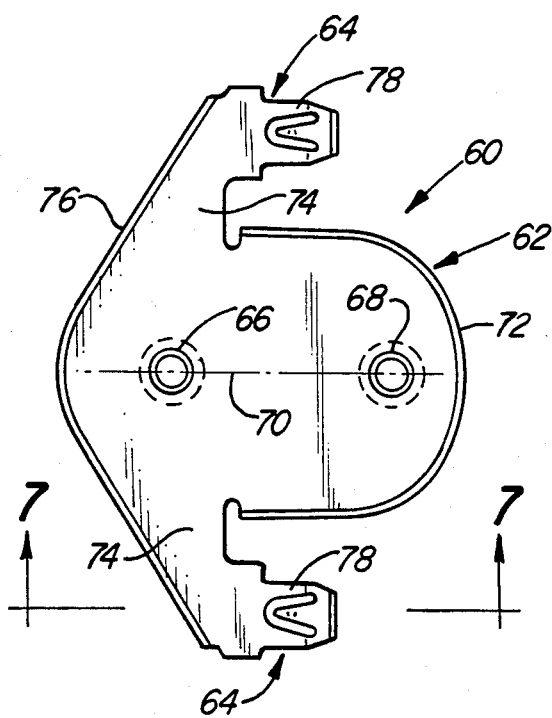
FIG. 6 is a top elevational view of a modified form of the fastener mounting assembly of FIGS. 1-5.
Figure 7:
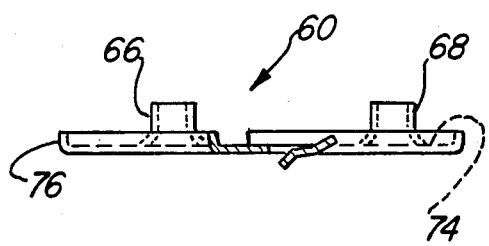
FIG. 7 is a vertical sectional view taken on line 7—7 of the clip element of FIG. 6.

FIGS. 6 and 7 show a modified form of the invention by providing a dual clip element generally indicated at 60. The dual clip element 60 includes a central body portion 62 flanked by a pair of rearwardly extending mirror image wing portions 64. The central body portion 62 is shown with a pair of extrusion sockets 66 and 68 aligned on the longitudinal axis 70 of symmetry of the dual clip element 60. The sockets 66 and 68, shown identical to the socket 18, are adapted to receive a pair of threaded fasteners (not shown), through a pair of aligned passage in a support panel (not shown). It will be noted that the central body portion is formed with peripheral upstanding flanges 72 while the wing portions 64, connected by intermediate portions 74, have a peripheral flange 76.

The mirror image wing portions each include a ramp attaching portion 78 identical to the single ramp attaching portion 16. By virtue of this arrangement the dual clip element ramp portions 78 are releasably attachable to a pair of open loop straps struck from a supporting panel (not shown) in the same manner as described for the single clip element of FIGS. 1-5. The dual clip element 60 is adapted for securing a heavy gauge member subjected to increased stresses or dynamic loading. Thus, the flanged central body portion, secured by a pair of threaded fasteners in sockets 66 and 68, provides a reinforcement backing for a support panel subjected to such loading.

Although only one embodiment of the invention has been disclosed and described, it is apparent that other embodiments and modifications thereof are possible within the scope of the appended claims.

What is claimed is:

1. A mounting assembly for a threaded fastener comprising in combination, a pair of plate members having surfaces disposed in substantially face-to-face relation and being releasably secured together, one of said plate members being a supporting member provided within elongated open loop strap portion struck from a pierced transversely extending slot in said supporting member so as to protrude from one surface thereof, said strap portion defined by a pair of transversely facing walls tapered upwardly from said supporting member one surface to a planar bridge portion disposed in a parallel manner a predetermined distance above said supporting member one surface defining a bridged opening, said strap defining a transversely extending slot having parallel vertically disposed for and aft opposed sides, said supporting member having a fastener receiving passage therein spaced a predetermined distance from said strap portion such that the center of said passage is located equidistant from the walls of said strap portion, the other plate member comprising a sheet metal element having a generally rectangular body portion at one end extending across and overlying said passage, said body portion having longitudinal and transverse sides and formed with fastener receiving means including thread engaging means for engaging a fastener, said thread engaging means aligned with said passage in position for threadably engaging the threaded fastener applied thereto such that the fastener extends through said passage, said sheet metal element having an integral attaching ramp portion extending longitudinally in an aft direction from one transverse side of said body portion and defining an acute angle with said body portion, said attaching ramp portion having a predetermined width less than said one transverse side defining a pair of stop shoulders on either end of said one transverse side, said attaching ramp portion having its free end formed with a transverse lip bent upwardly therefrom on a transverse bend line at an acute angle, a V-shaped cut-out in said attaching ramp portion defining a spring arm struck from said attaching portion, said arm positioned within said V-shaped cut-out and resiliently joined to said transverse lip at said bend line, said arm extending forwardly towards said body portion and terminating in a downwardly bent tongue defining an acute angle with said arm, said tongue having a forward extremity for engaging said slot forward side, said attaching ramp portion of a size to pass through said strap portion bridged opening causing said attaching ramp portion to resiliently flex said arm into contact with the undersurface of said strap bridge portion as said tongue is snapped into said slot, whereby upon said stop shoulders engaging said strap transversely facing walls said fastener receiving means is retained in alignment with said fastener receiving passage while said tongue extremity adapted to engage said slot forward side to positively retain said sheet metal element on said support plate member.

2. The mounting assembly as set forth in claim 1, wherein said fastener receiving means in the form of a threaded socket adapted to threadably receive a fastener thereon after passage through said supporting plate member fastener receiving passage.

3. The mounting assembly as set forth in claim 1, wherein said supporting plate member having a pair of first and second elongated open loop strap portions struck from pierced transversely extending slots on said supporting member, and said sheet metal element having a central body portion formed with one or more threaded fastener receiving means, said central body portion flanked by a pair of longitudinally extending mirror image wing portions, each said wing portion formed with one of said integral attaching ramp portions, whereby each said ramp portion adapted to be received in an associated strap portion such that said central body portion provides a supporting plate reinforcement member held in flush contact with the supporting plate member by means of a fastener engaging each said fastener receiving means upon passage through an aligned supporting plate member fastener receiving passage.

* * * * *